Feb. 27, 1968 G. F. GUETTLER ETAL 3,371,222
BI-DIRECTIONAL RING COUNTER
Filed May 25, 1965

INVENTORS
GERALD FRANK GUETTLER
ROBERT HANS ROOSEN

BY *Frank L. Neuhauser*
ATTORNEY 3,371,222

BI-DIRECTIONAL RING COUNTER

Gerald F. Guettler, St. Petersburg, and Robert H. Roosen, Clearwater, Fla., assignors to General Electric Company, a corporation of New York Filed May 25, 1965, Ser. No. 458,668
4 Claims. (Cl. 307—222)

ABSTRACT OF THE DISCLOSURE

A bi-directional ring counter comprises a plurality of silicon controlled switching stages. An input pulse causes an RC circuit to charge through a path which is determined by the selective energization of either an add or a subtract bus. The direction of the charging current effects the desired direction of counter operation.

The present invention relates to electronic counters and to be more specific to a ring counter which is able to operate in both the add and subtract mode.

A ring counter is an electronic circuit which, for each input pulse, some information is moved one step along a series of stages. A ring counter in the add mode would move the information along the stages in one direction while in the subtract mode would move it in the opposite direction. When the number of pulses supplied to the ring counter is sufficient such that the information is in its last stage, the next succeeding pulse causes the counter to register information of this fact in a succeeding counter and to become reset for another series of pulses.

It is an object of this invention to provide a relatively simple counting circuit which may be operated in either the add or subtract mode.

A more particular object is to provide a reversible ring counter utilizing a gate controlled bistable semiconductor switching element in each stage.

This result is achieved in a circuit in which each stage includes a silicon controlled switch and a set of steering diodes. Depending on whether the add or subtract mode has been selected, a selected voltage storage device charges during a count pulse thereby drawing current in a certain direction. If the ADD mode has been selected this current develops a voltage across a resistor in the gate circuit of a succeeding stage and alternately in the gate circuit of a preceding stage if the subtract mode has been set.

The subject matter which we regard as our invention is particularly pointed out and distinctly claimed in the appended claims. Our invention, however, both as to its organization and method of operation, together with further objects and advantages thereof, may best be understood by reference to the following description taken in connection with the accompanying drawings in which:

Figure 1:
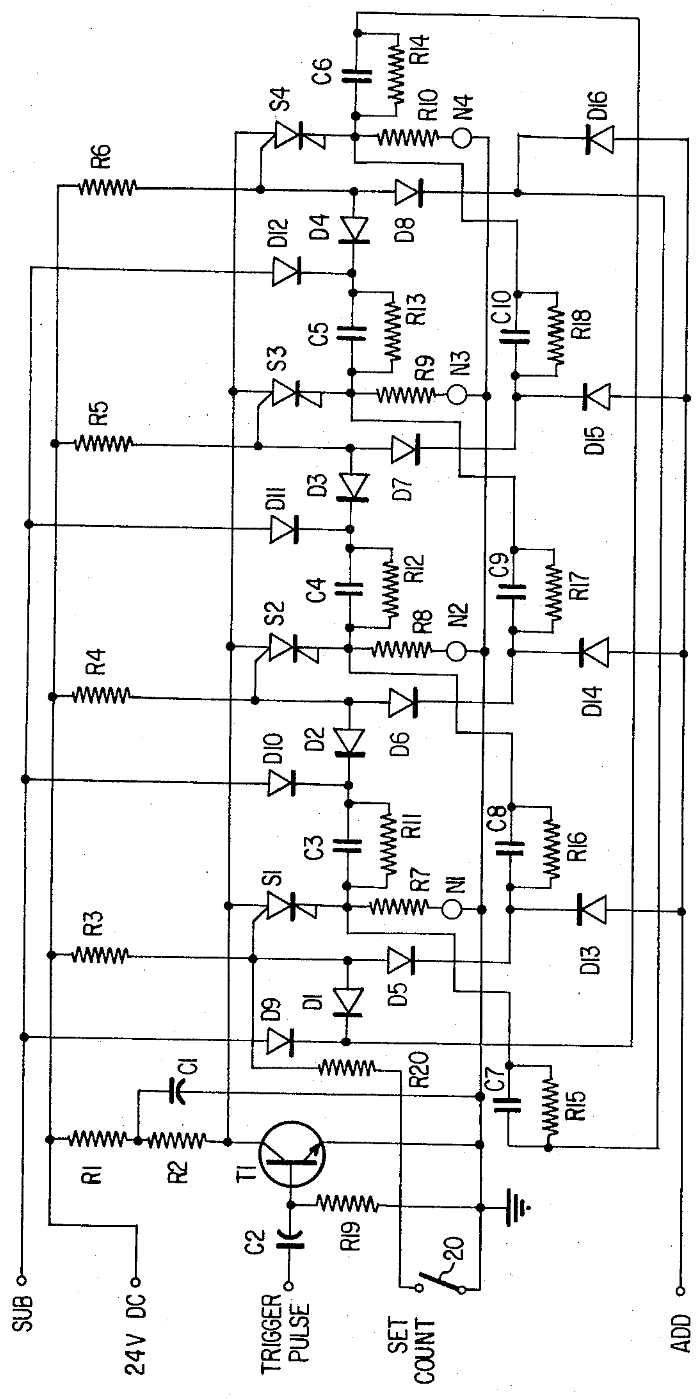
FIGURE 1 shows a circuit diagram of the ring counter of this invention.

The embodiment of FIGURE 1 is shown with four silicon controlled switch (SCS) stages connected in cascade but this is merely exemplary and more or less stages may be added at will. Anode voltage is supplied to the SCS's S1, S2, S3, and S4 through a pair of resistors R1 and R2 from a source of positive voltage. In this case the anode supply voltage is shown to be a positive 24 v. D.C. but this is also merely exemplary. The capacitor C1 is connected from the junction of R1 and R2 to ground. The function of the resistor R1 and the capacitor C1 is for decoupling purposes so as to prevent random "turnons" of the SCS's when the anode voltage is first applied. The 24 v. D.C. supply is also connected through resistors R3, R4, R5, and R6 to the respective gate electrodes of the switches S1, S2, S3, and S4. Resistors R7, R8, R9, and R10 are connected in series with lamps N1, N2, N3, and N4 in the anode-cathode circuits of the SCS's S1, S2, S3, and S4 respectively. The anode gate electrode of each SCS is connected through a series circuit comprising a diode and a capacitor to both the cathode of the last preceding SCS and the next succeeding SCS. To illustrate, at the junction of R4 and the anode gate electrode of S2, diode D2 and capacitor C3 are connected in series to the junction of R7 and the cathode of S1. Also at the junction of R4 and the anode gate of S2, diode D6 and capacitor C9 are connected in series to the junction of R9 and the cathode of S3. There are similar connections for each stage. Thus, at the junction of R5 and the anode gate electrode of S3, diode D3 and the capacitor C4 are connected in series to the junction of R8 and the cathode of S2. Also at the junction of R5 and the anode gate of S3, diode D7 and capacitor C10 are connected in series to the junction of R10 and the cathode of S4. At the junction of R6 and the anode gate electrode of S4, diode D4 and capacitors C5 are connected in series to the junction of R9 and the cathode of S3. Also at the junction of R6 and the anode gate of S4, diode D8 and capacitor C7 are connected in series to the junction of R7 and the cathode of S1. The cathode gates of S1, S2, S3, and S4 are connected to their respective cathodes.

Resistors R11 through R18 are connected across the capacitors C3 through C10 respectively and are used to control the charging and discharging rate of the capacitors. Diodes D9 through D12 connect a subtract (SUB) terminal to the respective junctions of the series combinations of diodes and capacitors which connect the anode gate electrodes of the SCS's to the last preceding stages. In like manner the diodes D13 through D16 connect an addition (ADD) terminal to the respective junctions of the series combinations of diodes and capacitors connecting the anode gate electrodes of the SCS's to the next succeeding stages. A transistor T1 has its collector-emitter circuit connected from the junction of the resistor R2 and the anodes of the SCS's to ground. A trigger pulse input terminal is connected through an input circuit comprising capacitor C2 and resistor R19 to the base electrode of the transistor T1. A "set count" terminal is shown connected through resistor R20 to the anode gate electrode of SCS S1; but it should be understood that this connection may be to the anode gate electrodes of any of the SCS's in the ring counter. The "set count" terminal can be connected to ground through a switch 20; however, any means of grounding the "set count" terminal will suffice.

The first step in the operation of the circuit of FIGURE 1, after the 24 v. D.C. supply has been applied, is to reset the circuit by momentarily grounding the "set count" terminal by momentarily closing the switch 20. This causes current to flow from the 24 v. D.C. supply through resistor R3 and resistor R20 to ground. The current flow through resistor R20 causes a negative voltage at the anode gate electrode of S1 with respect to its anode thereby turning it on. Conduction through S1 is indicated by the glow of the lamp N1 connected in the anode-cathode circuit.

The mode of operation is determined by applying a B+ potential to either the ADD or SUB terminal. With a 24 v. D.C. supply applied to the anodes of the SCS's, the preferred embodiment is to utilize a 24 v. D.C. potential for the B+. To illustrate the operation of FIGURE 1, the ADD mode will be first discussed.

In the quiescent state, before a trigger pulse is applied, the current flowing through the anode-cathode circuit of S1 creates a voltage at the junction of the cathode of S1 and the resistor R7 which opposes the voltage at the ADD terminal and the voltage at the D.C. supply terminal. The voltage across capacitors C7 and C3 is thus very small and the charge on these capacitors is at a minimum. In this embodiment this quiescent state of minimum charge on capacitors C7 and C3 is typically developed approximately 25 micro-seconds after the initiation of conduction through S1. Since the remaining SCS's are in their non-conducting state, the voltage at the junction of their cathodes and their load resistors is approximately at ground potential. Therefore, the 24 v. D.C. supply causes the capacitors C4, C5, and C6 to become fully charged to approximately 24 v. Similarly the 24 v. D.C. B+ at the ADD terminal causes the capacitors C8, C9, and C10 to become fully charged to approximately 24 v.

When a count is to be added, that is S1 turned off and S2 turned on, an input trigger pulse is applied to the transistor T1. This turns on T1 and it quickly saturates thereby providing a shunt path for the current flowing in the anode-cathode circuit of S1 so that the current of S1 falls below its holding value and conduction of S1 is halted. The magnitude of the trigger pulse necessary to turn the transistor T1 on is determined by the input circuit comprising the capacitor C2 and the resistor R19 as well as the particular type of transistor selected. The minimum pulse width of the trigger pulse is determined by the charging time constant of the capacitors C3 through C10. The time constant of these capacitors must be such that they have the ability to take additional charge when the trigger pulse is removed for purposes which will be more fully explained hereinafter. In a preferred embodiment the input trigger pulse must be at least one volt in amplitude and have a minimum pulse width of 30 micro-seconds.

With a trigger pulse applied the cessation of conduction through S1 removes the voltage from R7 thereby allowing the capacitors C3 and C7 to charge through the resistor R4, the diode D2, resistor R7, and lamp N1 and through the diode D16, resistor R7, and lamp N1 respectively. Since the charging time constants of the capacitors C3 and C7 are much longer than the duration of the input trigger pulse, these capacitors are still charging when the pulse is removed and the anode voltage is restored to the SCS's. The current building up charge on the capacitor C3 causes a voltage drop across the resistor R4 which holds the anode gate potential of S2 negative with respect to its anode thereby turning it on. Since the capacitor C7 charges through the diode D16 instead of the resistor R6, the SCS S4 remains in a nonconducting state. Conduction through S2 causes the voltage at the junction of R8 and the cathode of S2 to approach 24 v. thereby driving the capacitors C4 and C8 to their minimum charge. C4 discharges through R12 and C8 discharges through R16.

After the input trigger pulse is removed and anode voltage is restored to the SCS's, the approximately 24 v. charge on capacitors C4, C5, and C6 oppose current flow through resistors R5, R6, and R3 respectively thereby preventing turn on of SCS's S3, S4, and S1 respectively. Thus, after the input pulse is removed, only S2 is conducting. Conduction through S2 turns the lamp N2 on thereby adding a count to the ring counter.

When another count is to be added, another pulse is applied to the base of transistor T1 and an operation similar to that described above is initiated. Thus, transistor T1 saturates and the voltage at the anodes of all the SCS's is shunted to ground. S2 ceases to conduct and the capacitors C4 and C8 begin to build up charge. Since the charging path of capacitor C4 is through the resistor R5, diode D3, resistor R8, and lamp N2, a voltage is presented to the anode gate of S3. Since this voltage is negative with respect to the voltage at the anode, when the anode voltage is once again restored S3 will conduct. The capacitors C5 and C9 will then begin to discharge, thus readying the circuit for another input pulse or count.

If the ring counter had been in the SUB mode, and SCS S1 in the conducting state, the charging paths of the capacitors C3 and C7 would have been different. Capacitor C3 would have charged through the diode D10 the resistor R7 and the lamp N1 while capacitor C7 would have charged through resistor R6, diode D8, resistor R7, and lamp N1. The voltage developed across resistor R6 would create a negative voltage at the anode gate of S4 which would be sufficient to turn S4 on after its anode voltage has been restored. Thus one count would have been subtracted from the ring counter.

Inasmuch as all of the stages of the ring counter are alike, their operation is similar to the operation described. There is no limit to the number of stages that can be utilized, the only criterion being that one of the stages is "on" at any given time. The counting rate of the ring counter is limited by the values of the resistors R11 through R18 connected across the capacitors C3 through C10. In one embodiment, with this value set at 51K ohms, the maximum counting rate is 150 pulses per second. In another embodiment, with the value being 33K ohms, this counting rate was increased to 200 pulses per second.

Figure 2:
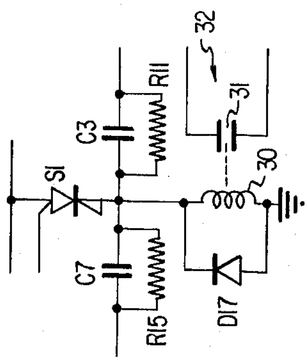
FIGURE 2 shows the anode-cathode circuit of one stage in another embodiment of this invention.

Instead of utilizing an indicating lamp as the cathode load of the SCS's a D.C. relay could be substituted which would function to open or close a set of contacts in some other extraneous circuit. This embodiment, illustrated in FIGURE 2, shows a diode D17 being connected across a relay coil 30 to suppress any negative voltage developed across the coil. The relay contacts 31 are shown in some extraneous circuit 32.

Although the circuit and method of operation has been described in a preferred embodiment, it should be understood that various modifications and other arrangements will be obvious to those skilled in the art. Thus it is not intended that applicant be limited to the embodiment described but rather should be entitled to the full scope of the appended claims.

What we claim as new and desire to secure by Letters Patent of the United States is:

1. A reversible ring counter comprising a plurality of controlled switch stages connected in cascade, each stage capable of being established in either of two discrete conducting states, each of said stages comprising a silicon control switch having an anode gate, a cathode, and an anode; means including a source of supply voltage connected to the anodes of each of said switches for establishing a selected one of said switch stages in a conductive state and the remaining of said switch stages in a non-conductive state; means responsive to an input pulse for shunting said supply voltage away from said anodes to thereby establish said selected conductive switch stage into a non-conductive state; a plurality of load impedances each of said load impedances being connected to the cathode of each respective one of said switches; a plurality of gate resistors each of said gate resistors being connected between said supply voltage source and the anode gate of a respective one of said switches; a plurality of first series circuits each including a diode and a first capacitor connected between the anode gate of each of said switches and the load impedance of an immediately preceding one of said switches; a plurality of second series circuits, each including a second diode and a second capacitor, connecting the anode gate of each of said switches to the load impedance of an immediately succeeding switch, means for determining preselected charging paths for said first and second capacitors, whereby when said selected conductive switch stage is rendered non-conductive by said pulse responsive means, an associated first capacitor charges through said first diode and the gate resistor connected to the anode gate of the immediately adjacent switch to produce a voltage drop across the last mentioned gate resistor to therby constitute means for establishing said adjacent switch in a conductive state, and an associated second capacitor simultaneously charges through its preselected charging path maintaining a predetermined one of said switches in a non-conductive state.

2. A reversible ring counter as defined in claim 1, wherein said charging path determining means comprise add and substract terminals, a plurality of first steering diodes, each connected between said subtract terminal and a respective one of each of said first series circuit, and a plurality of second steering diodes, each connected between said add terminal and a respective one of each of said second series circuit; and means for supplying voltage to either one of said terminals.

3. A reversible ring counter as defined in claim 1, wherein said pulse responsive means comprise a transistor having base and collector electrodes, and means for coupling said input pulse to said base electrode, said collector electrode being connected to the anodes of each of said silicon control switches.

4. A reversible ring counter as defined to claim 1, wherein the time constants of the charging paths of said first and second capacitors are of a sufficient value to permit the charging of said capacitors for a period longer than the duration of said input pulse.

References Cited

UNITED STATES PATENTS

| | | | |
|---|---|---|---|
| 3,025,418 | 3/1962 | Brahm | 307—88.5 |
| 3,135,875 | 6/1964 | Leightner | 307—88.5 |
| 3,260,858 | 7/1966 | Kueber | 307—88.5 |

OTHER REFERENCES

Solid State Design Application Note "Dynaquad Lock-N-Bit Shift Register" February 1962, pp. 43 and 45.

EEE, "Four Terminal Switches From NPN and PNP Planars," by D. G. Paterson et al., April 1963, pp. 72–74.

ARTHUR GAUSS, *Primary Examiner.*

J. ZAZWORSKY, *Assistant Examiner.*